(12) United States Patent
Miyoshi et al.

(10) Patent No.: US 7,742,408 B2
(45) Date of Patent: Jun. 22, 2010

(54) SYSTEM AND METHOD FOR FILTERING PACKETS IN A SWITCHING ENVIRONMENT

(75) Inventors: Takashi Miyoshi, San Jose, CA (US); Yukihiro Nakagawa, Cupertino, CA (US); Takeshi Shimizu, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 647 days.

(21) Appl. No.: 11/462,513

(22) Filed: Aug. 4, 2006

(65) Prior Publication Data

US 2008/0123525 A1 May 29, 2008

(51) Int. Cl.
*G01R 31/08* (2006.01)

(52) U.S. Cl. ......................... 370/230; 370/412; 370/413

(58) Field of Classification Search ................. 370/412, 370/413, 414–420, 542, 264, 428, 429; 709/249, 709/250; 398/43, 56, 89, 99; 726/13

See application file for complete search history.

(56) References Cited

U.S. PATENT DOCUMENTS

| 5,872,783 | A | 2/1999 | Chin |
|---|---|---|---|
| 6,233,244 | B1* | 5/2001 | Runaldue et al. ............ 370/412 |
| 6,724,779 | B1 | 4/2004 | Alleyne et al. |
| 6,766,389 | B2 | 7/2004 | Hayter et al. |
| 6,912,602 | B2 | 6/2005 | Sano et al. |
| 6,912,637 | B1 | 6/2005 | Herbst |
| 6,922,408 | B2 | 7/2005 | Bloch et al. |
| 6,922,749 | B1 | 7/2005 | Gil et al. |
| 6,934,283 | B1 | 8/2005 | Warner |
| 6,941,407 | B2 | 9/2005 | Shah et al. |
| 7,035,255 | B2 | 4/2006 | Tzeng |

| 2001/0005369 | A1 | 6/2001 | Kloth |
|---|---|---|---|
| 2002/0161923 | A1 | 10/2002 | Foster et al. |

(Continued)

FOREIGN PATENT DOCUMENTS

EP 1 130 854 A2 9/2001

(Continued)

OTHER PUBLICATIONS

European Search Report and Office Action, Application No. 07010676.0-1249, 8 pages, Oct. 7, 2007, Oct. 4, 2007.

(Continued)

*Primary Examiner*—Chi H Pham
*Assistant Examiner*—Kouroush Mohebbi
(74) *Attorney, Agent, or Firm*—Baker Botts L.L.P.

(57) ABSTRACT

In particular embodiments of the present invention, a method for filtering packets in a switching environment is provided. In particular embodiments, the method includes receiving a packet at an input port of a switch, the switch comprising a memory and one or more output ports. The method also includes storing at least a portion of the packet in the memory and determining one or more output ports from which the packet is to be communicated from the switch. The method further includes, after beginning to determine one or more output ports from which the packet is to be communicated from the switch, determining whether the packet is an illegal packet. The method also includes, if the packet is an illegal packet, dropping the packet from the memory, and if the packet is a legal packet, communicating the packet from the determined one or more output ports.

8 Claims, 4 Drawing Sheets

U.S. PATENT DOCUMENTS

| | | |
|---|---|---|
| 2002/0184529 A1 | 12/2002 | Foster et al. |
| 2003/0131131 A1 | 7/2003 | Yamada et al. |
| 2004/0158636 A1 | 8/2004 | Nakagawa et al. |
| 2004/0213237 A1 | 10/2004 | Yasue et al. |
| 2005/0053006 A1 | 3/2005 | Hongal et al. |
| 2005/0226146 A1 | 10/2005 | Rider |
| 2006/0227777 A1 | 10/2006 | Shimizu |
| 2007/0268903 A1 | 11/2007 | Nakagawa |
| 2007/0268926 A1 | 11/2007 | Nakagawa et al. |
| 2007/0280104 A1 | 12/2007 | Miyoshi et al. |
| 2008/0031269 A1 | 2/2008 | Shimizu et al. |
| 2008/0123525 A1 | 5/2008 | Miyoshi et al. |

FOREIGN PATENT DOCUMENTS

| | | |
|---|---|---|
| WO | WO 2004/023732 A1 | 3/2004 |

OTHER PUBLICATIONS

IEEE Standards, IEEE Standards for Local and Metropolitan Area Network, 802.1Q, May 7, 2003, 11 pages, May 7, 2003.

Shimizu et al., "A Single Chip Shared Memory Switch with Twelve 10Gb Ethernet Ports", pp. 1-17, Issued Aug. 19, 2003.

Horie et al., "Single-Chip, 10-Gigabit Ethernet Switch LSI", pp. 206-213, Fujitsu Sci. Tech. J., 42.2, Issued Jun. 2006.

Seifer, "The Switch Book,", Wiley Computer Publishing, ISBN 0-471-34586-5, pp. 1-698, 2000.

IEEE, "Shared and Independent VLAN Learning", Virtual and Bridged Local Area Networks, IEEE Computer Society, 802.1Q-2005, Annex B, pp. 225-232, IEEE Park Avenue, New York, NY, May 19, 2006.

Minkenberg et al., "A Combined Input and Output Queued Packet-Switched System Based on PRIZMA Switch-on-a-Chip Technology," IEEE Communications Magazine, pp. 70-71, Dec. 2000.

Sterbenz et al., "High-Speed Networking" A Systematic Approach to High-Bandwidth Low-Latency Communication, 5 pages, 2001.

Choudhury et al., "Dynamic Queue Length Thresholds for Shared-Memory Packet Switches", IEEE/ACM Transactions on Networking, vol. 6, No. 2, pp. 130-140, Apr. 1998.

Shreedhar et al., "Efficient Fair Queuing Using Deficit Round Robin," pp. 1-21, Oct. 16, 1995.

Roscoe et al., "Predicate Routing: Enabling Controlled Networking," ACM SIGCOMM Computer Communications Review, XP-001224681, vol. 33, No. 1, pp. 65-70, Jan. 2003.

EPO European Search Report for Application No./Patent No. 06007587.6-2416, Reference No. 114 663 a/Iga, Applicant: Fujitsu Ltd., 4 pages, mailed Aug. 1, 2006.

Nakagawa et al., "System and Method for Allocating Memory Resources in a Switching Environment," U.S. Appl. No. 11/419,703, filed May 22, 2006, 42 pages, 5 pps. drawings, 073338.0350.

Nakagawa, "System and Method for Assigning Packets to Output Queues", U.S. Appl. No. 11/419,713, filed May 22, 2006, 40 pages, 4 pps. drawings, 073338.0351.

Miyoshi et al., "System and Method for Managing Forwarded Database Resources in a Switching Environment", U.S. Appl. No. 11/421,679, filed Jun. 1, 2006, 33 pages, 4 pps. drawings, 073338.0354.

Shimizu et al., "Filtering Frames at an Input Port of a Switch", U.S. Appl. No. 11/278,751, filed Apr. 5, 2006, 24 pages, 3 pps. drawings, 073338.0308.

Nakagawa, "Managing Shared Memory Resources in a High-Speed Switching Environment", U.S. Appl. No. 10/3600,085, filed Feb. 7, 2003, 40 pages, 5 pps. drawings, 073338.0115.

Nakagawa, "Queuing Packets Written to Memory for Switching", U.S. Appl. No. 10/360,079, filed Feb. 7, 2003, 37 pages, 4 pps. drawings, 073338.0119.

* cited by examiner

SYSTEM AND METHOD FOR FILTERING PACKETS IN A SWITCHING ENVIRONMENT

TECHNICAL FIELD OF THE INVENTION

This invention relates generally to communication systems and more particularly to filtering packets in a switching environment.

BACKGROUND OF THE INVENTION

High-speed serial interconnects have become more common in communications environments, and, as a result, the role that switches play in these environments has become more important. Traditional switches do not provide the scalability and switching speed typically needed to support these interconnects.

SUMMARY OF THE INVENTION

Particular embodiments of the present invention may reduce or eliminate disadvantages and problems traditionally associated with shared memory resources in a switching environment.

In particular embodiments of the present invention, a method for filtering packets in a switching environment is provided. In particular embodiments, the method includes receiving a packet at an input port of a switch, the switch comprising a memory and one or more output ports. The method also includes storing at least a portion of the packet in the memory and determining one or more output ports from which the packet is to be communicated from the switch. The method further includes, after beginning to determine one or more output ports from which the packet is to be communicated from the switch, determining whether the packet is an illegal packet. The method also includes, if the packet is an illegal packet, dropping the packet from the memory, and if the packet is a legal packet, communicating the packet from the determined one or more output ports.

Particular embodiments of the present invention provide one or more advantages. In particular embodiments, a switch may filter short packets and reallocate the memory resources allocated to the short packets for more efficient use of these resources. In addition, particular embodiments may filter packets more efficiently, thereby reducing latency and increasing the throughput of a switch core. Particular embodiments may also reduce latency by using the switch's drop queue more efficiently. Certain embodiments provide all, some, or none of these technical advantages, and certain embodiments provide one or more other technical advantages readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

Figure 1:
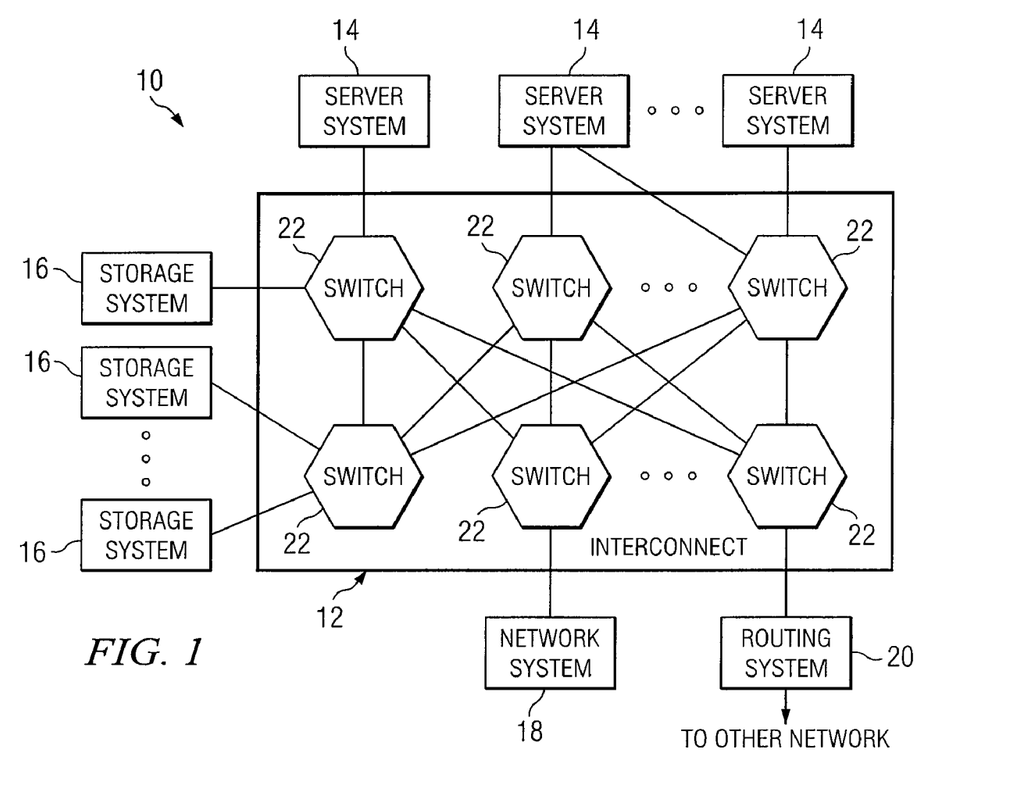
FIG. 1 illustrates an example system area network.

FIG. 1 illustrates an example system area network 10 that includes a serial or other interconnect 12 supporting communication among one or more server systems 14; one or more storage systems 16; one or more network systems 18; and one or more routing systems 20 coupling interconnect 12 to one or more other networks, which include one or more local area networks (LANs), wide area networks (WANs), or other networks. Server systems 14 each include one or more central processing units (CPUs) and one or more memory units. Storage systems 16 each include one or more channel adaptors, one or more disk adaptors, and one or more CPU modules. Interconnect 12 includes one or more switches 22, which, in particular embodiments, include Ethernet switches, as described more fully below. The components of system area network 10 are coupled to each other using one or more links, each of which includes one or more computer buses, local area networks (LANs), metropolitan area networks (MANs), wide area networks (WANs), portions of the Internet, or other wireline, optical, wireless, or other links. Although system area network 10 is described and illustrated as including particular components coupled to each other in a particular configuration, the present invention contemplates any suitable system area network including any suitable components coupled to each other in any suitable configuration.

Figure 2:
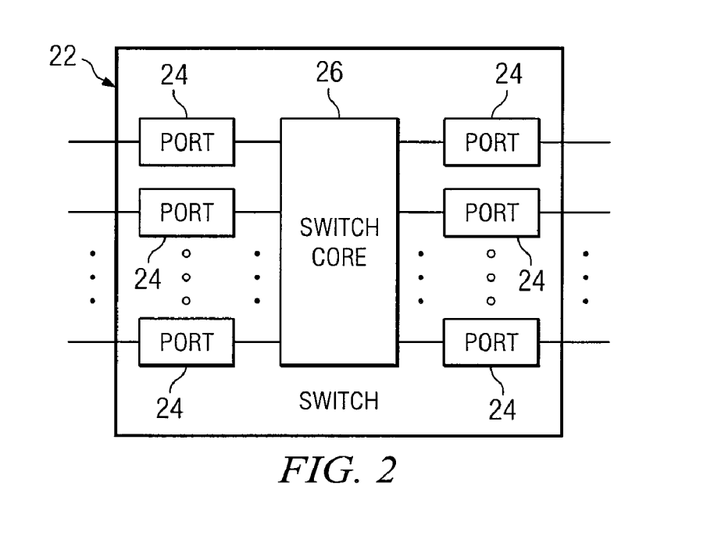
FIG. 2 illustrates an example switch of a system area network.

FIG. 2 illustrates an example switch 22 of system area network 10. Switch 22 includes multiple ports 24 and a switch core 26. Ports 24 are each coupled to switch core 26 and a component of system area network 10 (such as a server system 14, a storage system 16, a network system 18, a routing system 20, or another switch 22). A first port 24 receives a packet from a first component of system area network 10 and communicates the packet to switch core 26 for switching to a second port 24, which communicates the packet to a second component of system area network 10. Reference to a packet can include a packet, datagram, frame, or other unit of data, where appropriate. Switch core 26 receives a packet from a first port 24 and switches the packet to one or more second ports 24, as described more fully below. In particular embodiments, switch 22 includes an Ethernet switch. In particular embodiments, switch 22 can switch packets at or near wire speed.

Figure 3:
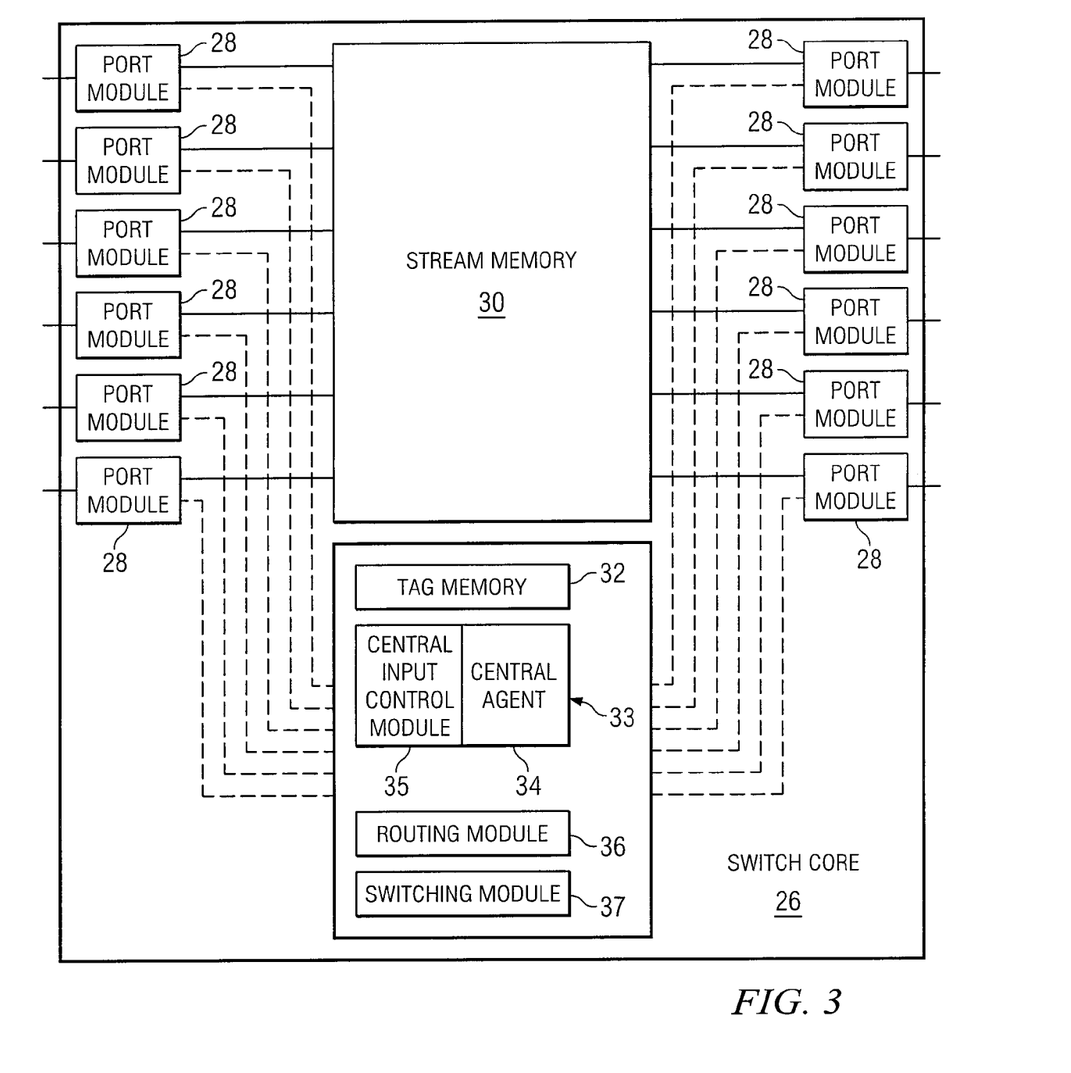
FIG. 3 illustrates an example switch core of a switch.

FIG. 3 illustrates an example switch core 26 of switch 22. Switch core 26 includes port modules 28, stream memory 30, tag memory 32, input control and central agent (ICCA) 33, routing module 36, and switching module 37. The components of switch core 26 are coupled to each other using buses or other links. In particular embodiments, switch core 26 is embodied in a single IC. In a default mode of switch core 26, a packet received by switch core 26 from a first component of system area network 10 can be communicated from switch core 26 to one or more second components of system area network 10 before switch core 26 receives the entire packet. In particular embodiments, cut-through forwarding provides one or more advantages (such as reduced latency, reduced memory requirements, and increased throughput) over store-and-forward techniques. Switch core 26 can be configured for different applications. As an example and not by way of limitation, switch core 26 can be configured for an Ethernet switch 22 (which includes a ten-gigabit Ethernet switch 22 or an Ethernet switch 22 in particular embodiments); an INFINIBAND switch 22; a 3GIO switch 22; a HYPER-TRANSPORT switch 22; a RAPID 10 switch 22; a proprietary backplane switch 22 for storage systems 16, network systems 18, or both; or other switch 22. It should be noted that, although switch core 26 includes twelve port modules 28 in the illustrated embodiment, switch core 26 may include any suitable number of port modules 28 (including, i.e., twenty-two).

A port module 28 provides an interface between switch core 26 and a port 24 of switch 22. Port module 28 is communicatively coupled to port 24, stream memory 30, tag memory 32, ICCA 33, routing module 36, and switching module 37. In particular embodiments, port module 28 includes both input logic (which is used for receiving a packet from a component of system area network 10 and writing the packet to stream memory 30) and output logic (which is used for reading a packet from stream memory 30 and communicating the packet to a component of system area network 10). As an alternative, in particular embodiments, port module 28 includes only input logic or only output logic. Reference to a port module 28 can include a port module 28 that includes input logic, output logic, or both, where appropriate. Port module 28 can also include an input buffer for inbound flow control. In an Ethernet switch 22, a pause function can be used for inbound flow control, which can take time to be effective. The input buffer of port module 28 can be used for temporary storage of a packet that is sent before the pause function stops incoming packets. Because the input buffer would be unnecessary if credits are exported for inbound flow control, as would be the case in an INFINIBAND switch 22, the input buffer is optional. In particular embodiments, the link coupling port module 28 to stream memory 30 includes two links: one for write operations (which include operations of switch core 26 in which data is written from a port module 28 to stream memory 30) and one for read operations (which include operations of switch core 26 in which data is read from stream memory 30 to a port module 28). Each of these links can carry thirty-six bits, making the data path between port module 28 and stream memory 30 thirty-six bits wide in both directions.

A packet received by a first port module 28 from a first component of system area network 10 is written to stream memory 30 from first port module 28 and later read from stream memory 30 to one or more second port modules 28 for communication from second port modules 28 to one or more second components of system area network 10. Reference to a packet being received by or communicated from a port module 28 can include the entire packet being received by or communicated from port module 28 or only a portion of the packet being received by or communicated from port module 28, where appropriate. Similarly, reference to a packet being written to or read from stream memory 30 can include the entire packet being written to or read from stream memory 30 or only a portion of the packet being written to or read from stream memory 30, where appropriate. Any port module 28 that includes input logic (an "input port module") can write to stream memory 30, and any port module 28 that includes output logic (an "output port module") can read from stream memory 30. In particular embodiments, a port module 28 may include both input logic and output logic and may thus be both an input port module and an output port module. In particular embodiments, the sharing of stream memory 30 by port modules 28 eliminates head-of-line blocking (thereby increasing the throughput of switch core 26), reduces memory requirements associated with switch core 26, and enables switch core 26 to more efficiently handle changes in load conditions at port modules 28.

Figure 4:
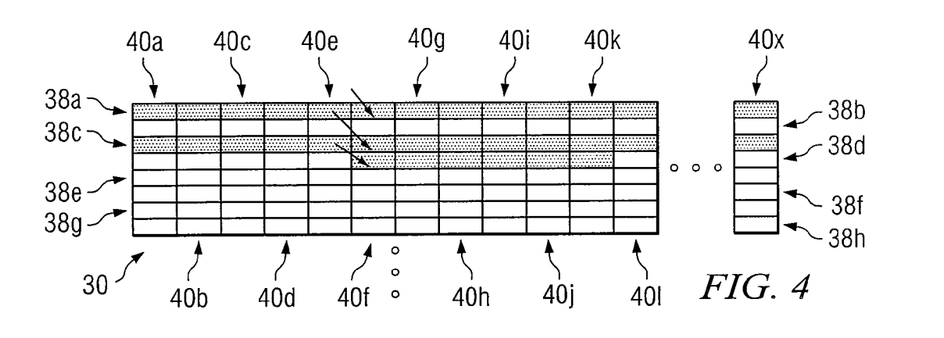
FIG. 4 illustrates an example stream memory of a switch core logically divided into blocks.

Stream memory 30 of switch core 26 is logically divided into blocks 38, which are further divided into words 40, as illustrated in FIG. 4. A row represents a block 38, and the intersection of the row with a column represents a word 40 of block 38. In particular embodiments, stream memory 30 is divided into 4096 blocks 38, each block 38 includes twenty-four words 40, and a word 40 includes seventy-two bits. Although stream memory 30 is described and illustrated as being divided into a particular number of blocks 38 that are divided into a particular number of words 40 including a particular number of bits, the present invention contemplates stream memory 30 being divided into any suitable number of blocks 38 that are divided into any suitable number of words 40 including any suitable number of bits. Packet size can vary from packet to packet. A packet that includes as many bits as or fewer bits than a block 38 can be written to one block 38, and a packet that includes more bits than a block 38 can be written to more than one block 38, which need not be contiguous with each other.

When writing to or reading from a block 38, a port module 28 can start at any word 40 of block 38 and write to or read from words 40 of block 38 sequentially. Port module 28 can also wrap around to a first word 40 of block 38 as it writes to or reads from block 38. A block 38 has an address that can be used to identify block 38 in a write operation or a read operation, and an offset can be used to identify a word 40 of block 38 in a write operation or a read operation. As an example, consider a packet that is 4176 bits long. The packet has been written to fifty-eight words 40, starting at word 40*f* of block 38*a* and continuing to word 40*k* of block 38*d*, excluding block 38*b*. In the write operation, word 40*f* of block 38*a* is identified by a first address and a first offset, word 40*f* of block 38*c* is identified by a second address and a second offset, and word 40*f* of block 38*d* is identified by a third address and a third offset. The packet can also be read from stream memory 30 starting at word 40*f* of block 38*a* and continuing to word 40*k* of block 38*d*, excluding block 38*b*. In the read operation, word 40*f* of block 38*a* can be identified by the first address and the first offset, word 40*f* of block 38*c* can be identified by the second address and the second offset, and word 40*f* of block 38*d* can be identified by the third address and the third offset.

Tag memory 32 includes multiple linked lists that can each be used, by, for example, central input control module 35, to determine a next block 38 to which first port module 28 may write and, by, for example, second port modules 28, to determine a next block 38 from which second port modules 28 may read. Tag memory 32 also includes a linked list that can be used by central agent 34 to determine a next block 38 that can be made available to a port module 28 for a write operation from port module 28 to stream memory 30, as described more fully below. Tag memory 32 includes multiple entries, at least some of which each correspond to a block 38 of stream memory 30. Each block 38 of stream memory 30 has a corresponding entry in tag memory 32. An entry in tag memory 32 can include a pointer to another entry in tag memory 32, resulting in a linked list.

Entries in tag memory 32 corresponding to blocks 38 that are available to a port module 28 for write operations from port module 28 to stream memory 30 can be linked together such that a next block 38 to which a port module 28 may write can be determined using the linked entries. When a block 38 is made available to a port module 28 for write operations from port module 28 to stream memory 30, an entry in tag memory 32 corresponding to block 38 can be added to the linked list being used to determine a next block 38 to which port module 28 may write.

A linked list in tag memory 32 being used to determine a next block 38 to which a first port module 28 may write can also be used by one or more second port modules 28 to determine a next block 38 from which to read. As an example, consider the linked list described above. A first portion of a packet has been written from first port module 28 to first block 38, a second portion of the packet has been written from first port module 28 to second block 38, and a third and final portion of the packet has been written from first port module 28 to third block 38. An end mark has also been written to third block 38 to indicate that a final portion of the packet has been written to third block 38. A second port module 28 reads from first block 38 and, while second port module 28 is reading from first block 38, uses the pointer in the first entry to determine a next block 38 from which to read. The pointer refers second port module 28 to second block 38, and, when second port module 28 has finished reading from first block 38, second port module 28 reads from second block 38. While second port module 28 is reading from second block 38, second port module 28 uses the pointer in the second entry to determine a next block 38 from which to read. The pointer refers second port module 28 to third block 38, and, when second port module 28 has finished reading from second block 38, second port module 28 reads from third block 38. Second port module 28 reads from third block 38 and, using the end mark in third block 38, determines that a final portion of the packet has been written to third block 38. While a linked list in tag memory 32 cannot be used by more than one first port module 28 to determine a next block 38 to which to write, the linked list can be used by one or more second port modules 28 to determine a next block 38 from which to read.

Different packets can have different destinations, and the order in which packets make their way through stream memory 30 need not be first in, first out (FIFO). As an example, consider a first packet received and written to one or more first blocks 38 before a second packet is received and written to one or more second blocks 38. The second packet could be read from stream memory 30 before the first packet, and second blocks 38 could become available for other write operations before first blocks 38. In particular embodiments, a block 38 of stream memory 30 to which a packet has been written can be made available to a port module 28 for a write operation from port module 28 to block 38 immediately after the packet has been read from block 38 by all port modules 28 that are designated port modules 28 of the packet. A designated port module 28 of a packet includes a port module 28 coupled to a component of system area network 10, downstream from switch core 26, that is a final or intermediate destination of the packet.

Using credits to manage write operations may offer particular advantages. For example, using credits can facilitate cut-through forwarding by switch core 26, which reduces latency, increases throughput, and reduces memory requirements associated with switch core 26. Using credits to manage write operations can also eliminate head-of-line blocking and provide greater flexibility in the distribution of memory resources among port modules 28 in response to changing load conditions at port modules 28. A credit corresponds to a block 38 of stream memory 30 and can be used by a port module 28 to write to block 38. A credit can be allocated to a port module 28 from a pool of credits, which is managed by central agent 34. Reference to a credit being allocated to a port module 28 includes a block 38 corresponding to the credit being made available to port module 28 for a write operation from port module 28 to block 38, and vice versa.

A credit in the pool of credits can be allocated to any port module 28 and need not be allocated to any particular port module 28. A port module 28 can use only a credit that is available to port module 28 and cannot use a credit that is available to another port module 28 or that is in the pool of credits. A credit is available to port module 28 if the credit has been allocated to port module 28 and port module 28 has not yet used the credit. A credit that has been allocated to port module 28 is available to port module 28 until port module 28 uses the credit. A credit cannot be allocated to more than one port module 28 at a time, and a credit cannot be available to more than one port module 28 at the same time. In particular embodiments, when a first port module 28 uses a credit to write a packet to a block 38 corresponding to the credit, the credit is returned to the pool of credits immediately after all designated port modules 28 of the packet have read the packet from block 38.

ICCA 33 includes central agent 34 and central input control module 35. Central agent 34 is operable to allocate credits to port modules 28 from the pool of credits. As an example, central agent 34 can make an initial allocation of a predetermined number of credits to a port module 28. Central agent 34 can make this initial allocation of credits to port module 28, for example, at the startup of switch core 26 or in response to switch core 26 being reset. As another example, central agent 34 can allocate a credit to a port module 28 to replace another credit that port module 28 has used. In particular embodiments, when port module 28 uses a first credit, port module 28 notifies central agent 34 that port module 28 has used the first credit, and, in response to port module 28 notifying central agent 34 that port module 28 has used the first credit, central agent 34 allocates a second credit to port module 28 to replace the first credit, if, for example, the number of blocks 38 that are being used by port module 28 does not meet or exceed an applicable limit. In particular embodiments, central agent 34 can store port-allocated credits in central input control module 35 of ICCA 33 until requested by port modules 28 after the receipt of a packet.

It should be noted that reference to a block 38 that is being used by a port module 28 includes a block 38 to which a packet has been written from port module 28 and from which all designated port modules 28 of the packet have not read the packet. By replacing, up to an applicable limit, credits used by port module 28, the number of credits available to port module 28 can be kept relatively constant and, if the load conditions at port module 28 increase, more blocks 38 can be supplied to port module 28 in response to the increase in load conditions at port module 28. A limit may be applied in certain circumstances to the number of blocks used by port module 28, which may prevent port module 28 from using too many blocks 38 and thereby use up too many shared memory resources. The limit can be controlled dynamically based on the number of credits in the pool of credits. If the number of credits in the pool of credits decreases, the limit can also decrease. The calculation of the limit and the process according to which credits are allocated to port module 28 can take place out of the critical path of packets through switch core 26, which increases the switching speed of switch core 26.

A linked list in tag memory 32 can be used by central agent 34 to determine a next credit that can be allocated to a port module 28. The elements of the linked list can include entries in tag memory 32 corresponding to blocks 38 that in turn correspond to credits in the pool of credits. As an example, consider four credits in the pool of credits. A first credit corresponds to a first block 38, a second credit corresponds to a second block 38, a third credit corresponds to a third block 38, and a fourth credit corresponds to a fourth block 38. A first entry in tag memory 32 corresponding to first block 38 includes a pointer to second block 38, a second entry in tag memory 32 corresponding to second block 38 includes a pointer to third block 38, and a third entry in tag memory 32 corresponding to third block 38 includes a pointer to fourth block 38. Central agent 34 allocates the first credit to a port module 28 and, while central agent 34 is allocating the first credit to a port module 28, uses the pointer in the first entry to determine a next credit to allocate to a port module 28. The pointer refers central agent 34 to second block 38, and, when central agent 34 has finished allocating the first credit to a port module 28, central agent 34 allocates the second credit to a port module 28. While central agent 34 is allocating the second credit to a port module 28, central agent 34 uses the pointer in the second entry to determine a next credit to allocate to a port module 28. The pointer refers central agent 34 to third block 38, and, when central agent 34 has finished allocating the second credit to a port module 28, central agent allocates the third credit to a port module 28. While central agent 34 is allocating the third credit to a port module 28, central agent 34 uses the pointer in the third entry to determine a next credit to allocate to a port module 28. The pointer refers central agent 34 to fourth block 38, and, when central agent 34 has finished allocating the third credit to a port module 28, central agent allocates the fourth credit to a port module 28.

When a credit corresponding to a block 38 is returned to the pool of credits, an entry in tag memory 32 corresponding to block 38 can be added to the end of the linked list that central agent 34 is using to determine a next credit to allocate to a port module 28. As an example, consider the linked list described above. If the fourth entry is the last element of the linked list, when a fifth credit corresponding to a fifth block 38 is added to the pool of credits, the fourth entry can be modified to include a pointer to a fifth entry in tag memory 32 corresponding to fifth block 38. Because entries in tag memory 32 each correspond to a block 38 of stream memory 30, a pointer that points to a block 38 also points to an entry in tag memory 32.

When a port module 28 receives an incoming packet, port module 28 determines whether enough credits are available to port module 28 to write the packet to stream memory 30. Port module 28 may do so, for example, by reading a counter at central agent 34 indicating the number of credits available to the port module 28 to write. Alternatively, port module 28 may receive this information automatically from central agent 34. In particular embodiments, if enough credits are available to port module 28 to write the packet to stream memory 30, port module 28 can write the packet to stream memory 30 using one or more credits. In particular embodiments, if enough credits are not available to port module 28 to write the packet to stream memory 30, port module 28 can write the packet to an input buffer and later, when enough credits are available to port module 28 to write the packet to stream memory 30, write the packet to stream memory 30 using one or more credits. As an alternative to port module 28 writing the packet to an input buffer, port module 28 can drop the packet. In particular embodiments, if enough credits are available to port module 28 to write only a portion of the packet to stream memory 30, port module 28 can write to stream memory 30 the portion of the packet that can be written to stream memory 30 using one or more credits and write one or more other portions of the packet to an input buffer. Later, when enough credits are available to port module 28 to write one or more of the other portions of the packet to stream memory 30, port module 28 can write one or more of the other portions of the packet to stream memory 30 using one or more credits. In particular embodiments, delayed cut-through forwarding, like cut-through forwarding, provides one or more advantages (such as reduced latency, reduced memory requirements, and increased throughput) over store-and-forward techniques. Reference to a port module 28 determining whether enough credits are available to port module 28 to write a packet to stream memory 30 includes port module 28 determining whether enough credits are available to port module 28 to write the entire packet to stream memory 30, write only a received portion of the packet to stream memory 30, or write at least one portion of the packet to stream memory 30, where appropriate.

In particular embodiments, the length of an incoming packet cannot be known until the entire packet has been received. In these embodiments, a maximum transmission unit (according to an applicable set of standards) can be used to determine whether enough credits are available to a port module 28 to write an incoming packet that has been received by port module 28 to stream memory 30. According to a set of standards published by the Institute of Electrical and Electronics Engineers (IEEE), the maximum transmission unit (MTU) of an Ethernet frame is 1518 bytes. According to a de facto set of standards, the MTU of an Ethernet frame is nine thousand bytes. As an example and not by way of limitation, consider a port module 28 that has received only a portion of an incoming packet. Port module 28 uses an MTU (according to an applicable set of standards) to determine whether enough credits are available to port module 28 to write the entire packet to stream memory 30. Port module 28 can make this determination by comparing the MTU with the number of credits available to port module 28. If enough credits are available to port module 28 to write the entire packet to stream memory 30, port module 28 can write the received portion of the packet to stream memory 30 using one or more credits and write one or more other portions of the packet to stream memory 30 using one or more credits when port module 28 receives the one or more other portions of the packet.

As discussed above, central agent 34 can monitor the number of credits available to port module 28 using a counter and provide this information to port module 28 automatically or after port module 28 requests the information. When central agent 34 allocates a credit to port module 28, central agent 34 increments the counter by an amount, and, when port module 28 notifies central agent 34 that port module 28 has used a credit, central agent 34 decrements the counter by an amount. The current value of the counter reflects the current number of credits available to port module 28, and central agent 34 can use the counter to determine whether to allocate one or more credits to port module 28. Central agent 34 can also monitor the number of blocks 38 that are being used by port module 28 using a second counter. When port module 28 notifies central agent 34 that port module 28 has written to a block 38, central agent increments the second counter by an amount and, when a block 38 to which port module 28 has written is released and a credit corresponding to block 38 is returned to the pool of credits, central agent decrements the second counter by an amount. Additionally or alternatively, central input control module 35 may also monitor the number of credits available to port modules 28 using its own counter(s).

The number of credits that are available to a port module 28 can be kept constant, and the number of blocks 38 that are being used by port module 28 can be limited. The limit can be changed in response to changes in load conditions at port module 28, one or more other port module 28, or both. In particular embodiments, the number of blocks 38 that are being used by a port module 28 is limited according to a dynamic threshold that is a function of the number of credits in the pool of credits. An active port module 28, in particular embodiments, includes a port module 28 that is using one or more blocks 38. Reference to a port module 28 that is using a block 38 includes a port module 28 that has written at least one packet to stream memory 30 that has not been read from stream memory 30 to all designated port modules 28 of the packet. A dynamic threshold can include a fraction of the number of credits in the pool of credits calculated using the following formula, in which α equals the number of port modules 28 that are active and ρ is a parameter:

$$\frac{\rho}{1+(\rho \times \alpha)}$$

A number of credits in the pool of credits can be reserved to prevent central agent 34 from allocating a credit to a port module 28 if the number of blocks 38 that are each being used by a port module 28 exceeds an applicable limit, which can include the dynamic threshold described above. Reserving one or more credits in the pool of credits can provide a cushion during a transient period associated with a change in the number of port modules 28 that are active. The fraction of credits that are reserved is calculated using the following formula, in which α equals the number of active port modules 28 and ρ is a parameter:

$$\frac{1}{1+(\rho \times \alpha)}$$

According to the above formulas, if one port module 28 is active and ρ is two, central agent 34 reserves one third of the credits and may allocate up to two thirds of the credits to port module 28; if two port modules 28 are active and ρ is one, central agent 34 reserves one third of the credits and may allocate up to one third of the credits to each port module 28 that is active; and if twelve port modules 28 are active and ρ is 0.5, central agent 34 reserves two fourteenths of the credits and may allocate up to one fourteenth of the credits to each port module 28 that is active. Although a particular limit is described as being applied to the number of blocks 38 that are being used by a port module 28, the present invention contemplates any suitable limit being applied to the number of blocks 38 that are being used by a port module 28.

In particular embodiments, central input control module 35 of ICCA 33 stores the credits allocated to particular port modules 28 by central agent 34 and can manage port-allocated credits using a linked list. Central input control module 35 can forward port-allocated credits to a particular, enabled port module 28 after the port module 28 requests a credit from central input control module 35. In particular embodiments, port-allocated credits are forwarded by central input control module 35 to enabled port modules 38 through switching module 37. When a port is disabled, central input control module 35 and switching module 37 may work together to collect and release the credits allocated to the disabled port. Although the illustrated embodiment includes central input control module 35 in ICCA 33, in alternative embodiments, central input control module 35 may reside in any suitable location, such as, for example, in central agent 34 or in port modules 28 themselves.

When a first port module 28 associated with an enabled port writes a packet to stream memory 30, first port module 28 can communicate to routing module 36 through switching module 37 information from the header of the packet (such as one or more destination addresses) that routing module 36 can use to identify one or more second port modules 28 that are designated port modules 28 of the packet. First port module 28 can also communicate to routing module 36 an address of a first block 38 to which the packet has been written and an offset that together can be used by second port modules 28 to read the packet from stream memory 30. The combination of this address and offset (or any other information used to identify the location at which the contents of a packet have been stored) will be referred to herein as a "pointer." Routing module 36 can identify second port modules 28 using one or more routing tables and the information from the header of the packet and, after identifying second port modules 28, communicate the pointer to the first block 38 to each second port module 28, which second port module 28 can add to an output queue, as described more fully below. In particular embodiments, routing module 36 can communicate information to second port modules 28 through ICCA 33.

In particular embodiments, switching module 37 is coupled between port modules 28 and both routing module 36 and ICCA 33 to facilitate the communication of information between port modules 28 and ICCA 33 or routing module 36 when a port is enabled. When a port is disabled, switching module 37 is operable to facilitate the collection and release of port-allocated credits associated with the disabled port. It should be noted that, although a single switching module 37 is illustrated, switching module 37 may represent any suitable number of switching modules. In addition, switching module 37 may be shared by any suitable number of port modules 28. Furthermore, the functionality of switching module 37 may be incorporated in one or more of the other components of the switch.

An output port module 28 can include one or more output queues that are used to queue pointers for packets that have been written to stream memory 30 and that are to be communicated from switch core 26 through the associated port module 28. When a packet is written to stream memory 30, routing module 36 may identify designated port modules, and a pointer associated with the packet may be added to an output queue of each port module 28 from which the packet is to be communicated. An output queue of a designated port module 28 can correspond to a variety of different variables.

In particular embodiments, a port module 28 includes a memory structure that can include one or more linked lists that port module 28 can use, along with one or more registers, to determine a next packet to read from stream memory 30. The memory structure includes multiple entries, at least some of which each correspond to a block 38 of stream memory 30. Each block 38 of stream memory 30 has a corresponding entry in the memory structure. An entry in the memory structure can include a pointer to another entry in the memory structure, resulting in a linked list. A port module 28 also includes one or more registers that port module 28 can also use to determine a next packet to read from stream memory 30. A register includes a read pointer, a write pointer, and an offset. The read pointer can point to a first block 38 to which a first packet has been written, the write pointer can point to a first block 38 to which a second packet (which could be the same packet as or a packet other than the first packet) has been written, and the offset can indicate a first word 40 to which the second packet has been written. Because entries in the memory structure each correspond to a block 38 of stream memory 30, a pointer that points to a block 38 also points to an entry in the memory structure.

Port module 28 can use the read pointer to determine a next packet to read from stream memory 30 (corresponding to the "first" packet above). Port module 28 can use the write pointer to determine a next entry in the memory structure to which to write an offset. Port module 28 can use the offset to determine a word 40 of a block 38 at which to start reading from block 38, as described further below. Port module 28 can also use the read pointer and the write pointer to determine whether more than one packet is in the output queue. If output queue is not empty and the write pointer and the read pointer both point to the same block 38, there is only one packet in the output queue. If there is only one packet in the output queue, port module 28 can determine a next packet to read from stream memory 30 and read the next packet from stream memory 30 without accessing the memory structure.

If a first packet is added to the output queue when there are no packets in the output queue, (1) the write pointer in the register is modified to point to a first block 38 to which the first packet has been written, (2) the offset is modified to indicate a first word 40 to which the first packet has been written, and (3) the read pointer is also modified to point to first block 38 to which the first packet has been written. If a second packet is added to the output queue before port module 28 reads the first packet from stream memory 30, (1) the write pointer is modified to point to a first block 38 to which the second packet has been written, (2) the offset is written to a first entry in the memory structure corresponding to first block 38 to which the first packet has been written and then modified to indicate a first word 40 to which the second packet has been written, and (3) a pointer in the first entry is modified to point to first block 38 to which the second packet has been written. The read pointer is left unchanged such that, after the second packet is added to the output queue, the read pointer still points to first block 38 to which the first packet has been written. As described more fully below, the read pointer is changed when port module 28 reads a packet in the output queue from stream memory 30. If a third packet is added to the output queue before port module 28 reads the first packet and the second packet from stream memory 30, (1) the write pointer is modified to point to a first block 38 to which the third packet has been written, (2) the offset is written to a second entry in the memory structure corresponding to first block 38 to which the second packet has been written and modified to indicate a first word 40 to which the third packet has been written, and (3) a pointer in the second entry is modified to point to first block 38 to which the third packet has been written. The read pointer is again left unchanged such that, after the third packet is added to the output queue, the read pointer still points to first block 38 to which the first packet has been written. Port module 28 can use the output queue to determine a next packet to read from stream memory 30.

If a port module 28 includes more than one output queue, an algorithm can be used for arbitration among the output queues. Arbitration among multiple output queues can include determining a next output queue to use to determine a next packet to read from stream memory 30. Arbitration among multiple output queues can also include determining how many packets in a first output queue to read from stream memory 30 before using a second output queue to determine a next packet to read from stream memory 30. The present invention contemplates any suitable algorithm for arbitration among multiple output queues. As an example and not by way of limitation, according to an algorithm for arbitration among multiple output queues of a port module 28, port module 28 accesses output queues that are not empty in a series of rounds. In a round, port module 28 successively accesses the output queues in a predetermined order and, when port module 28 accesses an output queue, reads one or more packets in the output queue from stream memory 30. The number of packets that port module 28 reads from an output queue in a round can be the same as or different from the number of packets that port module 28 reads from each of one or more other output queues of port module 28 in the same round. In particular embodiments, the number of packets that can be read from an output queue in a round is based on a quantum value that defines an amount of data according to which more packets can be read from the output queue if smaller packets are in the output queue and fewer packets can be read from the output queue if larger packets are in the output queue, which can facilitate fair sharing of an output link of port module 28.

Much of the discussion above has assumed that packets received at a switch are legal packets to be stored and transmitted from the switch. However, some packets may be illegal for one or more reasons. For example, some packets may be "short" packets, illegal because they have lengths below a defined minimum length. Other packets may be illegal for any other suitable reason. It is generally desirable for a switch to filter packets in order to drop illegal packets.

Because, in many cases, packets do not carry length information in their headers, a switch cannot filter a "short" packet until the switch receives (or not) a minimum length of the packet. This is the case, for example, with Ethernet packets, which do not carry length information in their headers. Many typical switches have been designed to filter short packets by determining whether a packet is short before beginning handling of the packet as a legal packet.

Figure 5:
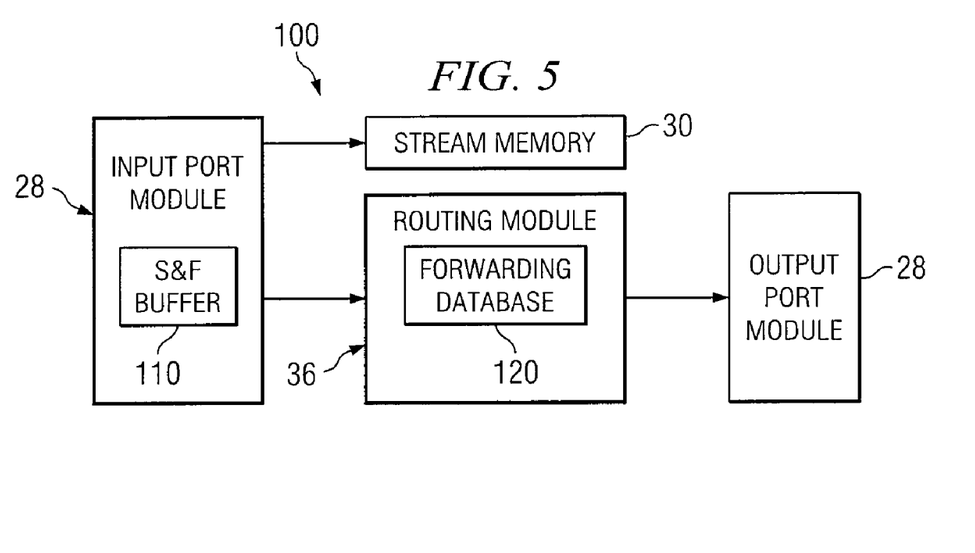
FIG. 5 illustrates an example system for filtering packets.

FIG. 5 illustrates an example system 100 for filtering packets. Example system 100 comprises an input port module 28 comprising a store and forward buffer 110, stream memory 30, forwarding database 120 at routing module 36, and output port module 28. Input port module 28 receives incoming packets. After receiving an incoming packet, input port module 28 begins to store the packet in buffer 110, which may be memory dedicated to the particular input port module 28. Using a counter (not illustrated), input port module also begins to count the number of bytes of the incoming packet that have been received. Buffer 110 stores at least part of the incoming packet until port module 28 determines whether the packet is a short packet. Port module 28 may determine that the packet is short if the packet's tail is received before a pre-defined minimum packet length is received. Port module 28 may determine that the packet is not short if the pre-defined minimum packet length is received.

For Ethernet, the minimum packet length is defined as sixty-four bytes. Thus, port module 28 may determine that the packet is short if the packet's tail is received before sixty-four bytes are counted for the packet. Port module 28 may determine that the packet is not short if sixty-four bytes are counted for the packet. In the case of Ethernet, store and forward buffer 110 may be sized to store the first sixty-four bytes of a packet.

If the received packet is a short packet, input port module 28 drops the received packet from buffer 110 such that buffer 110 can be reused to store any new incoming packet (for short packet filtering purposes), and input port module 28 does not forward the received packet to stream memory 30 for storage. If the incoming packet is not short, input port module 28 forwards the incoming packet (including the part of the packet stored in buffer 110) to the part of stream memory 30 corresponding to the input port module's allocated credits. If the incoming packet is not short, input port module 28 also sends information associated with the packet (such as, for example, header information) to a forwarding database 120 in routing module 36 for suitable routing. Forwarding database 120 uses the information to identify output ports of the switch from which the packet will be transmitted, generating a forwarding request (i.e., a pointer) associated with the stored packet for each identified output port. The request(s) may then be forwarded from routing module 36 to the proper output port modules(s). Output port modules 28 then suitably queue received requests and use the requests to retrieve their associated packets from stream memory 30 and to transmit the packets in a suitable order.

As can be observed, latency is created by storing a portion (e.g. sixty-four bytes) of a packet in store and forward buffer 110 before storing the packet in stream memory 30 and accessing forwarding database 120. The amount of latency is the extra time needed to write the portion of the packet to buffer 110. In other words, checking to see whether a packet is short before processing the packet delays the transmission of packets that are not short. Thus, a need exists for a different system for filtering packets that can reduce this latency.

Figure 6:
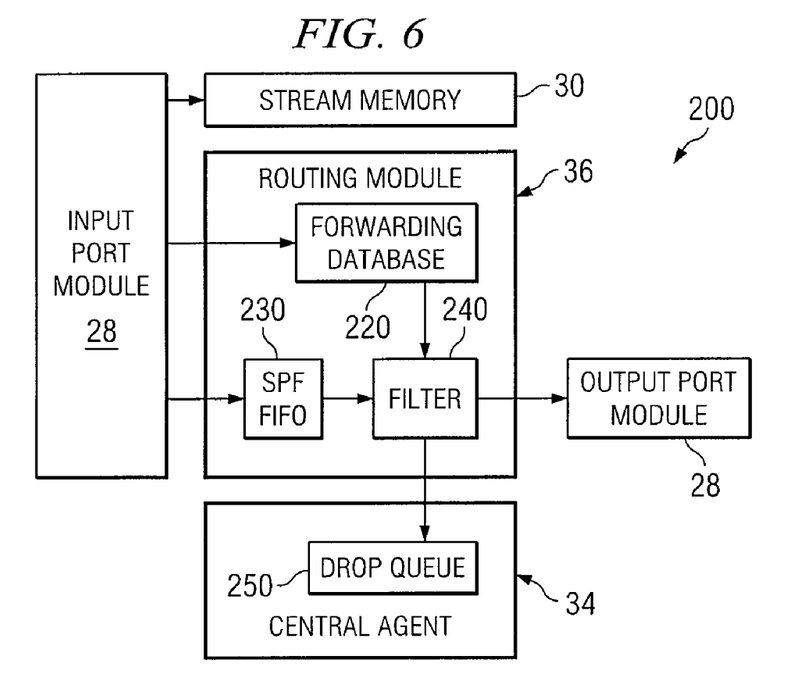
FIG. 6 illustrates another example system for filtering packets.

FIG. 6 illustrates another example system 200 for filtering packets. Example system 200 comprises an input port module 28, stream memory 30, routing module 36 comprising forwarding database 220, SPF FIFO 230, and filter 240, central agent 34 comprising drop queue 250, and output port module 28. System 200 is operable to reduce latency by beginning handling of a received packet as if it were a legal packet until it is determined that the packet is short, rather than, as in many typical switches, determining whether the packet is short before beginning handling of the packet as a legal packet.

Input port module 28 is operable to receive incoming packets entering a particular input port of a switch. After receiving at least part of an incoming packet, input port module 28 is further operable to begin storing the packet directly to blocks of stream memory 30 (and not first to a store and forward buffer for short-packet filtering purposes). At approximately the same time, input port module 28 is further operable to begin counting (using a counter, not illustrated) the number of bytes of the incoming packet for short-packet filter purposes. At approximately the same time, input port module 28 is further operable to forward information associated with the packet (such as, for example, header information and/or the packet's location in stream memory) to forwarding database 220 in routing module 36 for suitable routing. In this manner, storage in stream memory 30 and processing at routing module 36 can begin before a short-packet determination is made.

Input port module 28 may determine that the packet is short if, for example, module 28 receives the packet's tail before receiving a pre-defined, minimum packet length (such as sixty-four for an Ethernet packet). Input port module 28 may determine that the packet is not short if port module 28 receives at least the pre-defined, minimum packet length. After input port module 28 determines whether the packet is short, input port module 28 is operable to issue a flag indicating whether the packet is a short packet. In alternative embodiments, any suitable component in the switch may determine whether a packet is invalid (i.e., a short packet) and issue a flag. Such a flag may be used, as described below, to either continue or discontinue the packet forwarding process depending on whether the packet is legal or not. Input port module 28 is further operable to send the flag to SPF FIFO 230 in routing module 36, as described below.

It should be noted that, in particular embodiments, while making a short-packet determination, input port module 28 may determine that a packet is illegal for any other suitable reason. For example, while making a short-packet determination for an incoming internet protocol (IP) packet, input port module 28 may assess information in the first sixty-four bytes of the packet for other illegal characteristics. This information may include, for example, the packet's protocol type, source IP address, destination IP address, port addresses, and priority (traffic class). In particular embodiments, input port module 28 is operable to issue a flag indicating whether the packet is illegal based on an assessment of this packet information in addition to the short-packet assessment.

Routing module 36 comprises forwarding database 220, SPF FIFO 230, and filter 240. Forwarding database 220 is operable to receive information associated with the packet from port module 28 and use this information to identify output ports of the switch from which the packet is to be transmitted. Forwarding database 220 may use, for example, a table to identify these output ports. Forwarding database 220 may also be operable to generate a forwarding request (including, for example, a pointer to the stored packet) for each identified output port from which the packet is to be output and send these request(s) to filter 240. Although, in the illustrated embodiment, forwarding database 220 resides in routing module 36, forwarding database 220 may reside in any suitable location in the switch.

SPF FIFO 230 may comprise any suitable module operable to synchronize the timing of flags received from input port module 28 and forwarding requests generated by forwarding database 220. In many cases, the amount of time to make a short packet determination (after storing a minimum number of bytes) and generate a flag is much less than the time to generate forwarding requests. Thus, in those cases, SPF FIFO 230 is operable to buffer a flag associated with a packet until filter 240 receives forwarding request(s) associated with the packet. SPF FIFO 230 is operable to send the flag to filter 240 when filter 240 receives the associated forwarding request(s) from database 220. Filter 240 may deal with the forwarding request(s) appropriately based on the value of the associated flag. Alternatively, filter 240 may access the flag in SPF FIFO 230 in any suitable manner. Although SPF FIFO 230 resides in routing module 36 in the illustrated embodiment, SPF FIFO 230 may reside in any suitable location. Also, in particular embodiments, each input port module 28 may be associated with a corresponding SPF FIFO 230. For example, a switch comprising twenty-two input port modules 28 may also comprise twenty-two SPF FIFOs 230, one SPF FIFO 230 for each input port module 28.

Filter 240 is operable to receive forwarding requests from database 220 and flags from SPF FIFO 230. In particular embodiments, where each input port module 28 is associated with a corresponding SPF FIFO 230, filter 240 is operable to use the source port number included in the received forwarding requests to choose the correct SPF FIFO 230 (the one associated with the particular source port) from which to receive a flag (corresponding to the forwarding requests). After receiving the forwarding request(s) and flag associated with a particular packet, filter 240 is operable to use the flag to determine whether to send the forwarding request(s) to the appropriate output port modules 28 or whether to drop the packet without communicating the packet from the switch. If the flag indicates that the packet is not short (legal), filter 240 is operable to send the forwarding request(s) associated with the packet to the appropriate output port modules 28. If the flag indicates that the packet is short (illegal), filter 240 is operable to send a drop request to drop queue 250 in central agent 34 to drop the packet. The drop request may comprise, for example, a pointer(s) to the block(s) in stream memory allocated to the illegal packet. Dropping a packet generally refers to releasing the block(s) of stream memory 30 storing the packet to the pool of available blocks, making the block(s) available for allocation to any suitable input port (for storing incoming packets). If a packet is dropped because it is illegal (i.e. it is a short packet), the packet may not be forwarded to output port modules 28. It should be noted that, although filter 240 resides in routing module 36 in the illustrated embodiment, filter 240 may reside in any suitable location in the switch.

Drop queue 250 is operable to receive drop requests from filter 240. These requests may be, for example, pointers to packets that are to be dropped. Drop queue 250 is further operable to queue the drop requests, select a drop request, and drop the packet associated with the selected drop request. Drop queue 250 is thus operable to release the block(s) allocated to the dropped packet to the pool of available blocks. Central agent 34 may, for example, access this pool to allocate any of the block(s) to any suitable input port for storage of new, incoming packets. Although drop queue 250 resides in central agent 34 in the illustrated embodiment, drop queue 250 may reside in any suitable location in the switch.

It should be noted that, in particular cases, the blocks allocated to a dropped packet may include more blocks than the blocks to which the packet has been written. For example, two blocks may be allocated to write a packet to stream memory 30, but only the first block may be written to by input port module 28 before determining that the packet is illegal. In such circumstances, after determining that the packet is illegal, input port module 28 may stop writing the packet, and the packet may be dropped. In particular embodiments, as described further below in conjunction with FIG. 7, the first block may be forwarded to drop queue 250 and the second block may be reused by the input port module 28 (without first being forwarded to drop queue 250).

Output port module 28 is operable to receive forwarding requests from filter 240 for legal packets. Output port module 28 is operable to process these requests (such as, for example, by placing them in a queue structure) and transmit their associated packets in any suitable manner, as described above.

In operation, input port module 28 receives incoming packets entering a particular input port of a switch. As the packet is received, input port module 28 begins storing at least a portion of the packet to block(s) of stream memory 30. At approximately the same time, input port module 28 also begins counting the number of bytes of the incoming packet for short-packet filtering purposes and begins forwarding information associated with the packet to forwarding database 220 in routing module 36. In this manner, storage in stream memory 30 and processing at routing module 36 begins before a short-packet determination is made. After input port module 28 determines whether the packet is a legal packet, input port module 28 issues a flag indicating whether the packet is legal. Input port module 28 sends this flag to SPF FIFO 230 in routing module 36.

Forwarding database 220 receives information associated with the packet from input port module 28 and uses this information to identify output ports of the switch from which the packet is to be transmitted. Forwarding database 220 also generates a forwarding request for each identified output port and sends these request(s) to filter 240 in routing module 36. In many cases, the amount of time to make a short packet determination (after storing a minimum number of bytes) and generate a flag is much less than the time to generate forwarding requests. In these cases, SPF FIFO 230 synchronizes the flag and the forwarding request(s) by, for example, buffering the flag until filter 240 receives the forwarding request(s) from database 220. SPF FIFO 230 may then send the flag to filter 240 when filter 240 receives the forwarding request(s). Alternatively, filter 240 may access the flag in SPF FIFO 230 in any suitable manner.

Filter 240 receives the forwarding request(s) from database 220 and flag from SPF FIFO 230. Filter 240 uses the flag to determine whether to send the forwarding request(s) to the appropriate output port module(s) 28 or whether to drop the packet without communicating the packet from the switch. If the flag indicates that the packet is legal, filter 240 sends the forwarding request(s) to the appropriate output port module (s) 28. The output port module(s) 28 receives the forwarding request from filter 240, processes the request, and transmits the associated packet from the associated output port. If the flag indicates that the packet is illegal, filter 240 sends a drop request to drop queue 250 in central agent 34 to drop the packet. Drop queue 250 receives the drop request from filter 240, queues the request, and after selecting the request, drops the packet associated with the selected request. Drop queue 250 may thus release the block(s) allocated to the illegal packet to the pool of available blocks. After the block(s) is released to the pool, central agent 34 may, for example, access the pool to allocate the block(s) to any suitable input port for storage of new, incoming packets.

Modifications, additions, or omissions may be made to the systems and methods described without departing from the scope of the disclosure. The components of the systems and methods described may be integrated or separated according to particular needs. Moreover, the operations of the systems and methods described may be performed by more, fewer, or other components without departing from the scope of the present disclosure. In addition, system 200 may be used to determine and process accordingly other types of illegal packets.

As discussed above, a switch may, at times, receive an illegal packet. In some cases, the number of blocks of stream memory 30 allocated to store the illegal packet may be greater than one. This may be the case, for example, with regard to short packets if the size of a memory block is relatively small (i.e., less than sixty-four bytes or other minimum packet lengths). In such a case, more than one memory block may be allocated for storing a packet (and more than one block may be written to) before it is determined whether the packet contains sixty-four bytes and thus before the short packet is dropped. Multiple blocks may also be allocated to store other types of illegal packets before such illegal packets are dropped. Examples of such other types of illegal packets may include packets associated with VLAN violations such as an ingress violation, an egress violation, or a port-state violation. In typical switches, to drop these packets, drop requests for all of the packets' allocated blocks are placed in a drop queue. Placing a large number of requests in a drop queue may have the disadvantage, however, of delaying the release and reuse of the blocks associated with the requests in the queue. Thus, a different method of reusing blocks allocated to illegal packets may be used to reduce this delay.

Figure 7:
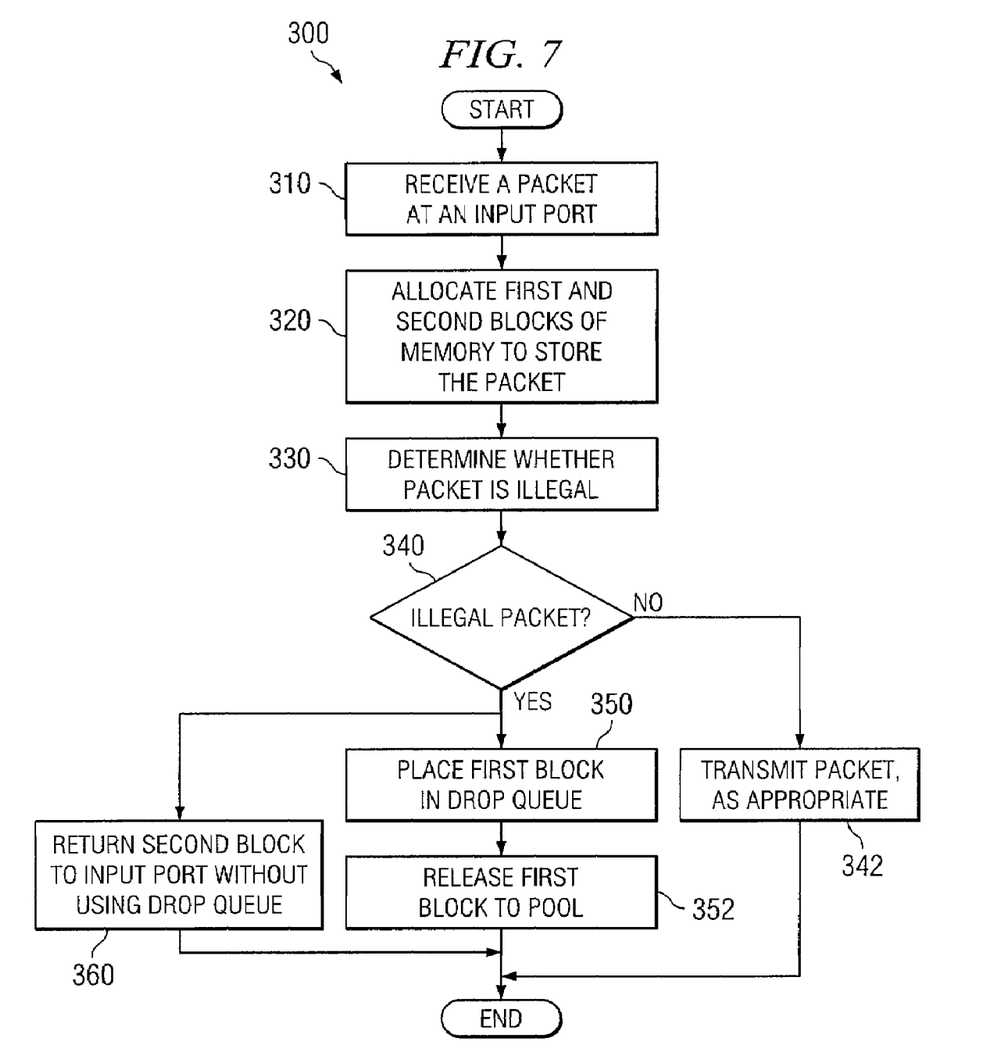
FIG. 7 is a flowchart illustrating an example method for reusing blocks allocated to illegal packets.

FIG. 7 is a flowchart illustrating an example method 300 for reusing blocks allocated to illegal packets. Method 300 begins at step 310 where an incoming packet is received at an input port of a switch. At step 320, before a determination is made whether the incoming packet is illegal, two or more blocks (i.e., a first block and a second block) in stream memory 30 are allocated for storing the incoming packet. Part of the packet may be written to the first allocated block before the determination is made whether the incoming packet is illegal. In particular embodiments, however, none of the packet may be written to the second allocated block (or, more generally, to at least one of the allocated blocks) before a determination is made whether the incoming packet is illegal. This may be the case, for example, if the time to make a determination of illegality is shorter than the time to finish writing to the first block. In alternative embodiments, at least part of the received packet is also written to the second allocated block (or to additional allocated blocks) before a determination of packet illegality is made.

At steps 330 and 340, a determination is made whether the packet is illegal. The determination may be made, for example, by input port module 28, central agent 34, routing module 36, or any other suitable component of the switch. An illegal packet may be, for example, a short packet, a packet associated with an ingress violation, a packet associated with an egress violation, a packet associated with a port-state violation, or any other appropriate type of illegal packet. At step 342, if the packet is legal, the packet is processed and transmitted by the switch from appropriate output port(s). If the packet is illegal, a decision is made to drop the illegal packet. This decision is forwarded to a drop queue (in, i.e., central agent 34) and to the input port module 28 that received (or is receiving) the illegal packet at steps 350 and 360, respectively.

At step 350, if the packet is illegal, a request to drop the first block to which the packet has been allocated and written is placed in the drop queue. In particular embodiments, no other requests to drop other block(s) allocated for storing the illegal packet are placed in the drop queue, and the other allocated block(s) are reused directly by the input port module 28 to store new incoming packets (discussed below at step 360). In alternative embodiments, requests to drop more than one block to which the packet has been allocated (and, optionally, written) may be placed in the drop queue, so long as one or more other allocated blocks are reused directly by the input port module 28. In particular embodiments, the request(s) placed in the drop queue may be forwarded to the drop queue by, for example, routing module 36. In particular short-packet filtering embodiments, routing module 36 may place the request(s) in the drop queue after routing module 36 receives a flag from input port module 28 identifying the packet as illegal (as described above in conjunction with FIG. 6). At step 352, the drop queue may select one of the drop request(s) and release the block associated with the selected drop request to the pool of available blocks. The block may then be allocated to the same or a different input port by, for example, central agent 34.

At step 360, which may occur concurrently to step 350, the input port module 28 that received (or is receiving) the illegal packet may determine (by, i.e., being notified by routing module 36) that the packet is illegal. After determining that the packet is illegal, the input port module 28 may stop writing any more of the illegal packet to stream memory 30 if the packet is still being received. After determining that the packet is illegal, the input port module 28 may also determine (i.e., by being notified by routing module 36) that one or more of the block(s) to which the illegal packet was allocated may be reused by the input port module 28 for storage of new incoming packets. In particular embodiments, the reused block(s) may not yet have been written to by input port module 28. In alternative embodiments, one or more of the reused block(s) may have been written to by input port module 28 to store part of the illegal packet. In either case, these block(s) may be reused by the input port module 28 without the block(s) first being placed in the drop queue. By placing only one block (or limited blocks) per packet in the drop queue and allowing the input port module 28 to reuse the remainder of the blocks directly, delays in the reuse of memory blocks may be reduced.

Modifications, additions, or omissions may be made to the systems and methods described without departing from the scope of the disclosure. The components of the systems and methods described may be integrated or separated according to particular needs. Moreover, the operations of the systems and methods described may be performed by more, fewer, or other components without departing from the scope of the present disclosure.

Although the present disclosure has been described with several embodiments, sundry changes, substitutions, variations, alterations, and modifications can be suggested to one skilled in the art, and it is intended that the disclosure encompass all such changes, substitutions, variations, alterations, and modifications falling within the spirit and scope of the appended claims.

What is claimed is:

1. A method for filtering packets in a switching environment, comprising:
    receiving a packet at an input port of a switch, the switch comprising a memory and one or more output ports;
    storing at least a portion of the packet in the memory;
    determining one or more output ports from which the packet is to be communicated from the switch;
    after beginning to determine one or more output ports from which the packet is to be communicated from the switch, determining whether the packet is an illegal packet;
    if the packet is an illegal packet, dropping the packet from the memory; and
    if the packet is a legal packet, communicating the packet from the determined one or more output ports;
    wherein the switch comprises a drop queue and wherein the memory is logically divided into a plurality of blocks, the method further comprising allocating at least a first block and a second block of memory to the input port to store the packet, and wherein dropping the packet from the memory comprises:
        sending a drop request for the first block to the drop queue; and
        reusing the second block at the input port for storage of another packet without sending a drop request for the second block to the drop queue and without waiting for the second block to be released to a pool of available blocks.

2. The method of claim 1, wherein determining whether the packet is an illegal packet comprises determining whether the packet comprises less bytes than a minimum required number of bytes.

3. The method of claim 1, further comprising:
    after determining whether the packet is an illegal packet, issuing a flag identifying whether the packet is an illegal packet;
    buffering the flag until the one or more output ports from which the packet is to be communicated from the switch are determined; and
    using the flag, determining whether to drop the packet or communicate the packet from the determined output ports.

4. The method of claim 1, further comprising releasing the blocks of memory allocated to storing packets associated with drop requests in the drop queue to allow reallocation of the released blocks of memory to one or more input ports for storage of one or more other packets in the released blocks of memory.

5. A system for filtering packets in a switching environment, comprising:
    an input port of a switch configured to receive a packet, the input port associated with an input port module;
    a memory of the switch configured to store at least a portion of the packet, the memory logically divided into a plurality of blocks;
    a routing module of the switch configured to determine one or more output ports of the switch from which the packet is to be communicated from the switch, the input port module configured to determine whether the packet is an illegal packet after the routing module begins to determine the one or more output ports from which the packet is to be communicated from the switch;

a central agent of the switch comprising a drop queue and configured to drop at least some of the packet from the memory if the packet is an illegal packet; and one or more output ports of the switch configured to communicate the packet from the switch if the packet is a legal packet and if the one or more output ports are determined by the routing module;

wherein the central agent is further configured to allocate at least a first block and a second block of memory to the input port to store the packet, and wherein, if the packet is an illegal packet:

the routing module is further configured to send a drop request for the first block to the drop queue; and the input port module is further configured to reuse the second block for storage of another packet without a drop request for the second block being sent to the drop queue and without waiting for the second block to be released to a pool of available blocks.

6. The system of claim 5, wherein determining whether the packet is an illegal packet comprises determining whether the packet comprises less bytes than a minimum required number of bytes.

7. The system of claim 5, wherein the input port module is further configured to issue a flag identifying whether the packet is an illegal packet after determining whether the packet is an illegal packet, the routing module further configured to buffer the flag until the one or more output ports from which the packet is to be communicated from the switch are determined, the routing module further configured to determine whether to drop the packet or communicate the packet from the determined output ports using the flag.

8. The system of claim 5, wherein the central agent is configured to release the blocks of memory allocated to storing packets associated with drop requests in the drop queue to allow reallocation of the released blocks of memory to one or more input ports for storage of one or more other packets in the released blocks of memory.

\* \* \* \* \*